(12) United States Patent
Suganuma

(10) Patent No.: US 7,022,271 B2
(45) Date of Patent: Apr. 4, 2006

(54) METHOD AND APPARATUS FOR OBSERVING FLOW OF RESIN

(75) Inventor: Masashi Suganuma, Nagano (JP)

(73) Assignee: Nissei Plastic Industrial Co., Ltd., Hanishina-gun (JP)

( * ) Notice: Subject to any disclaimer, the term of this patent is extended or adjusted under 35 U.S.C. 154(b) by 279 days.

(21) Appl. No.: 10/353,115

(22) Filed: Jan. 27, 2003

(65) Prior Publication Data

US 2003/0141614 A1 Jul. 31, 2003

(30) Foreign Application Priority Data

Jan. 30, 2002 (JP) .............................. 2002-022455

(51) Int. Cl.
*B29C 45/76* (2006.01)

(52) U.S. Cl. .................... 264/40.4; 264/219; 425/145; 425/173; 425/183; 425/190

(58) Field of Classification Search ............... 264/40.4, 264/219, 328.1; 425/145–148, 173, 183, 425/181, 185, 190, 195, 169
See application file for complete search history.

(56) References Cited

U.S. PATENT DOCUMENTS

| | | | | |
|---|---|---|---|---|
| 5,110,533 | A * | 5/1992 | Hendry | 264/572 |
| 5,549,857 | A * | 8/1996 | Kamiguchi et al. | 264/40.1 |
| 6,017,973 | A * | 1/2000 | Tamura et al. | 522/96 |
| 6,558,590 | B1 * | 5/2003 | Stewart | 264/40.5 |
| 6,581,438 | B1 * | 6/2003 | Hall et al. | 73/53.01 |
| 6,599,460 | B1 * | 7/2003 | Brown et al. | 264/328.12 |
| 6,688,870 | B1 * | 2/2004 | Shibata et al. | 425/117 |

FOREIGN PATENT DOCUMENTS

JP 08-141725 * 6/1996

OTHER PUBLICATIONS

Suganuma, Masamoto, Japan 2003-220629 Abstract, published Aug. 5, 2003.*
Composite Materials Handbook, vol. 1. Polymer Matris Composites, Department of Defense Handbook, USA, pp. 4-23 through 4-27.*
Mohan, R.V., et al., "Analysis and Characterization of Flow Channels during Manufacturing of Composites by Resin Transfer Molding", Specialized Molding Techniques, William Andrew Publishing, 2001, pp. 193-207.*

* cited by examiner

*Primary Examiner*—Jill L. Heitbrink
(74) *Attorney, Agent, or Firm*—Hamre, Schumann, Mueller & Larson, P.C.

(57) ABSTRACT

For observing a flow of molten resin in an injection molding apparatus, a transparent cylinder, which is formed of transparent glass or transparent plastic material, is used in place of a mold of the apparatus. Because filling the transparent cylinder with the molten resin up to the cylinder's full capacity will burst the cylinder, the molten resin injection is terminated on the way when the injected molten resin has occupied a predetermined percentage, in a range of 50–90%, of the total volume of the cylinder, so that a burst of the cylinder can be avoided. The transparent cylinder provides for an increased resin-flow observation range because of its transparency, and can be less expensive because it is formed of inexpensive glass or plastic. As a consequence, there can be provided an efficient resin-flow observing experiment apparatus at lower cost.

4 Claims, 4 Drawing Sheets

METHOD AND APPARATUS FOR OBSERVING FLOW OF RESIN

FIELD OF THE INVENTION

The present invention relates to an improved technique for observing a flow of resin in an injection molding apparatus.

BACKGROUND OF THE INVENTION

FIG. 5 is a front view of an injection molding apparatus provided with a convention resin-flow observing apparatus. The injection molding apparatus 100 includes a base 101, on which are placed an injection unit 106 and a mold clamping unit. The injection unit 106 includes a nozzle 102, heating cylinder 103, screw drive section 104 and hopper 105, etc., and the mold clamping unit includes a mold 108 and is covered with a safety cover 107. Fluid pressure unit and input/output unit 109 are provided within the base 101. Further, the mold 108 has fitted therein a lens 111 to provide an observation window, through which a user or human operator is allowed to observe molten resin flowing in the mold 108. The lens 111 is a circular lens made of transparent glass or plastic material.

In precision molding techniques today, it is extremely important to know exactly the flowing behavior of the molten resin. Valuable data may be acquired if a flow of molten resin can be observed through the lens 111.

However, for pressure resisting reasons, it is difficult to increase the diameter of the lens 111, and the lens 111 must be limited to a relatively small diameter. With the lens 111 having a small diameter, only a narrow resin-flow observation range can be provided, which thus permits acquisition of only a limited quantity of data. Therefore, there has been a demand for a more sophisticated technique that can considerably increase the resin-flow observation range. In addition, fitting the lens in the mold would increase the necessary number of manufacturing steps and necessary cost of the resin-flow observing apparatus, and therefore there has also been a demand for a less expensive resin-flow observing apparatus or experiment apparatus.

SUMMARY OF THE INVENTION

In view of the foregoing prior art problems, it is an object of the present invention to provide an improved resin-flow observing method and apparatus which achieve an increased resin-flow observation range at low cost.

In an attempt to solve the problems of the conventional resin-flow observing apparatus, the inventor of the present invention et al. conducted an experiment where molten resin is injected by an injection unit into a test cylinder made of quartz glass connected to a sprue. Needless to say, the test cylinder broke or burst under these conditions. However, repeating the experiment a plurality of times showed that the burst of the test cylinder could be avoided if the molten resin injection into the test cylinder is terminated on the way. Namely, it was shown that, if the maximum injecting pressure of the injection unit is 10 MPa (about 100 kg/cm$^2$) and the pressure resisting capability of the test cylinder is 5 MPa (about 5 kg/cm$^2$), the test cylinder breaks or bursts when it is almost filled with the molten resin.

However, where the test cylinder is not filled with the molten resin to its full capacity, more favorable results are obtained as stated below. Normally, before initiation of the molten resin injection, an air pressure of 0.1 MPa exists in the test cylinder. When the molten resin has been injected into half (50%) of the total capacity of the test cylinder, the air pressure in the test cylinder rises up to 0.2 MPa that is two times as high as the original pressure of 0.1 MPa, and the injected molten resin is also pressurized to 0.2 MPa through pressure balance action in the test cylinder; therefore, the test cylinder would not burst under these conditions.

When the molten resin has been injected into four fifths (80%) of the test cylinder, the air pressure in the test cylinder rises up to 0.5 MPa that is five times as high as the original pressure of 0.1 MPa, and the injected molten resin is also pressurized to 0.5 MPa through the pressure balance action in the test cylinder; namely, in this case, the test cylinder reaches the upper limit of its pressure resisting capability. The above-mentioned test results indicates that the test cylinder can be used safely, without a break or burst, as long as a predetermined volume of air is left in the test cylinder.

Further, if the test cylinder opening at one end and closed at the other end is replaced with a test cylinder that is formed of glass or plastic material and open at both ends, and if an air passage for leaking or releasing air from the cylinder is formed in the movable mold mount with the one end of the glass or plastic test cylinder connected to the sprue and the other end connected to the movable mold mount, a pressure increase within the test cylinder can be effectively delayed by allowing a part of the remaining air in the test cylinder to escape through the air passage during the molten resin injection. In this way, the test cylinder can be filled with molten resin up to 90% of the cylinder's inner volume or capacity.

For the reasons stated above, the present invention provides an improved method for observing a flow of resin in an injection molding apparatus, which comprises the steps of: interposing a transparent cylinder between a fixed mold mount and movable mold mount of a mold clamping unit of the injection molding apparatus; causing an injection unit of the injection molding apparatus to inject molten resin into the transparent cylinder; and causing the injection unit to terminate injection of the molten resin when the injected molten resin has occupied a predetermined percentage of a total volume of the transparent cylinder. In the present invention, the predetermined percentage is in a range of 50–90%.

The present invention also provides an improved apparatus for observing a flow of resin in an injection molding apparatus, which comprises: a transparent cylinder interposed between a fixed mold mount and movable mold mount of a mold clamping unit of the injection molding apparatus; and a controller for causing an injection unit of the injection molding apparatus to inject molten resin into the transparent cylinder and causing the injection unit to terminate injection of the molten resin when the injected molten resin has occupied a predetermined percentage of a total volume of the transparent cylinder. In the present invention, the predetermined percentage is in a range of 50–90%.

With the present invention, all portions, except for the opposite ends, of the transparent cylinder can be readily viewed by a human operator. Thus, the human operator can easily and sufficiently observe a flow of molten resin injected in such a transparent cylinder. With the arrangement that the molten resin injection into the transparent cylinder is terminated when the predetermined percentage, in the range of 50–90%, of the total volume or capacity of the transparent cylinder has been occupied with the molten resin, it is possible to prevent an undesired burst of the transparent cylinder, so that the resin-flow observing experiment can be conducted safely.

As compared to the conventional resin-flow observing experiment apparatus including the observation lens fitted in the mold, the experiment apparatus of the present invention can be constructed at extremely low cost because no modification or change has to be made to the existing mold, and it also provides a greatly-increased resin-flow observation range to thereby permit acquisition of data of better quality.

BRIEF DESCRIPTION OF THE DRAWINGS

Certain preferred embodiments of the present invention will hereinafter be described in detail, by way of example only, with reference to the accompanying drawings, in which.

DETAILED DESCRIPTION OF THE PREFERRED EMBODIMENTS

Figure 1:
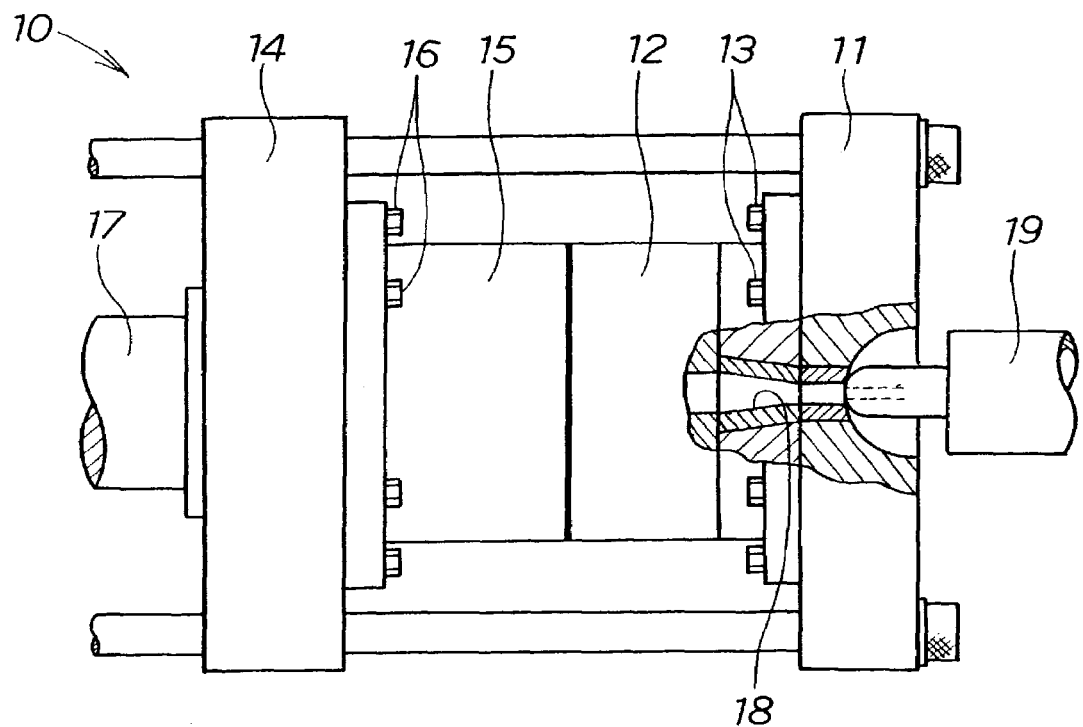
FIG. 1 is a view showing an injection molding apparatus to which is applied the principles of the present invention.

FIG. 1 is a view showing an injection molding apparatus to which is applied the principles of the present invention. The injection molding apparatus 10 includes a fixed mold half 12 secured to a fixed mold mount 11 by means of fastener means such as bolts 13, and a movable mold half 15 secured to a movable mold mount 14 by means of fastener means such as bolts 16. After the fixed mold half 12 and movable mold half 15 are tightened together by pressing action of a cylinder 17 of a mold clamping unit, molten resin is injected into the mold halves 12 and 15 by an injection unit 19 through a sprue 18, as well known in the art. The bolts 13 and 16 may be replaced with magnets.

To observe a flow of the molten resin in the injection molding apparatus 10, the fixed mold half 12 is detached from the fixed mold mount 11 of the mold clamping unit, and the movable mold half 15 is also detached from the movable mold mount 14 of the mold clamping unit.

Figure 2:
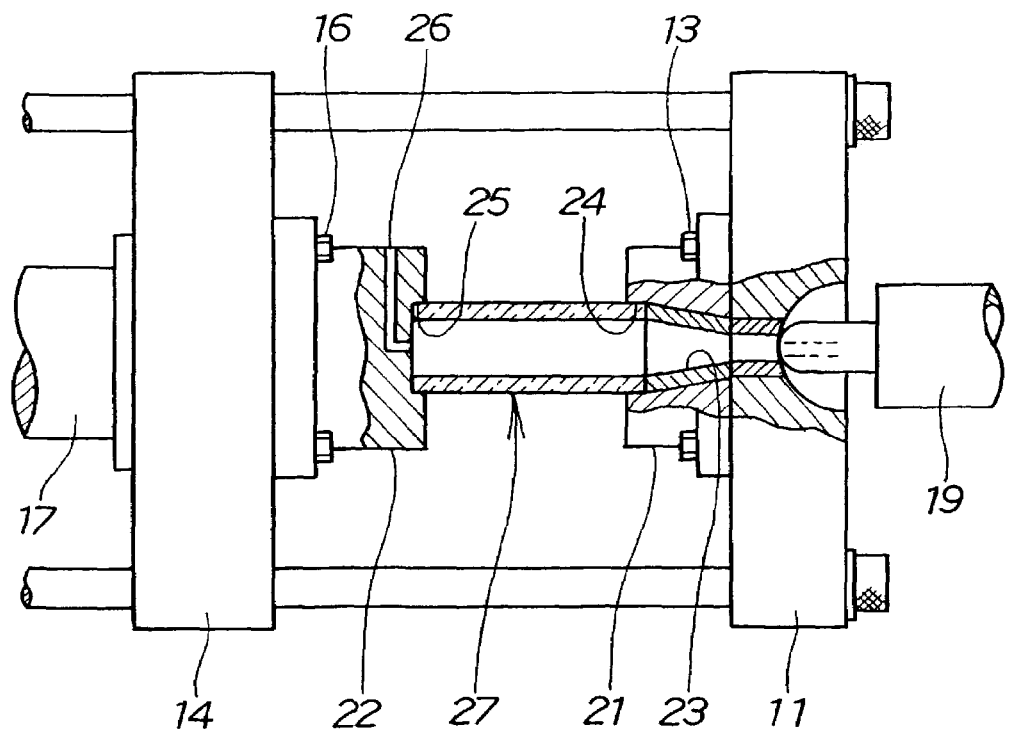
FIG. 2 is a view explanatory of a manner in which a transparent cylinder is mounted on the injection molding apparatus.

FIG. 2 is a view explanatory of a manner in which a transparent cylinder 27 is mounted on the injection molding apparatus 10 so that a flow (flowing behavior) of molten resin can be observed through the transparent cylinder 27 on an experimental basis as will be described in detail. As shown, a dummy fixed mold half 21 is secured to the fixed mold mount 11, and a dummy movable mold half 22 is secured to the movable mold mount 14. The dummy fixed mold half 21 has a sprue 23 and cylinder fitting recess 24 formed therein, and the dummy movable mold half 22 has a cylinder fitting recess 25 and air passage 26 of a very small diameter formed therein.

The transparent cylinder 27 is fitted at its opposite ends in the dummy fixed mold half 21 and dummy movable mold half 22 so that it extends between the opposed mold halves 21 and 22. The transparent cylinder 27 is formed of transparent glass or transparent plastic material. Preferably, the glass is quartz glass, and the plastic material is polycarbonate. The transparent cylinder 27 may be in the shape of a cylinder opening at opposite ends thereof, or substantially in the shape of a test tube or cylinder closed only at one end thereof.

Figure 3A:
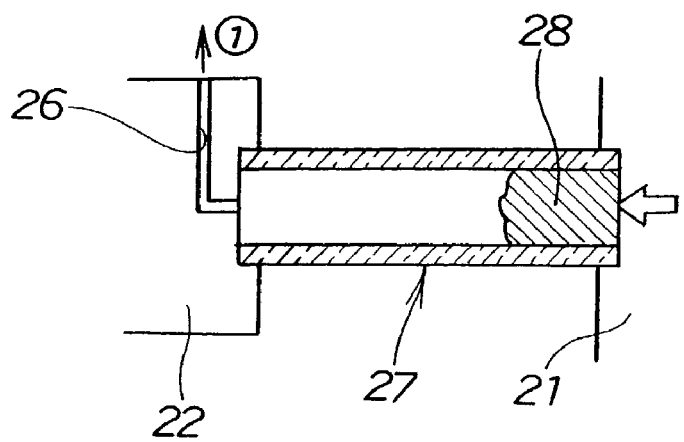
FIGS. 3A and 3B are diagrams explanatory of a method of the present invention for observing a flow of resin in the injection molding apparatus.
Figure 3B:
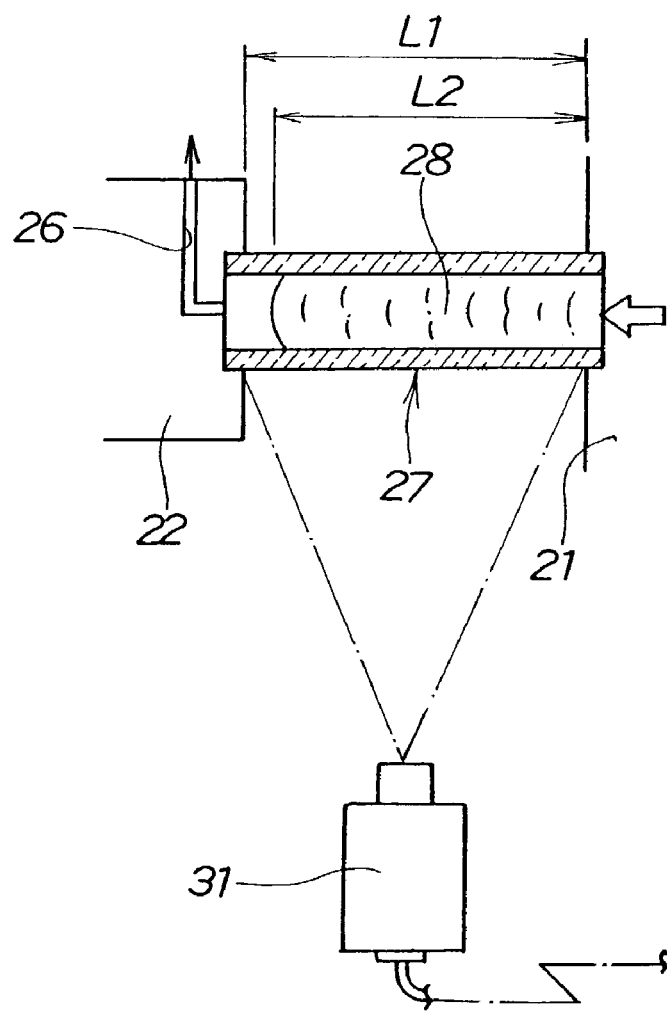

FIGS. 3A and 3B are diagrams explanatory of a method of the present invention for observing a flow of resin in the injection molding apparatus 10.

In FIG. 3A, injection, into the transparent cylinder 27, of molten resin 28 is initiated as denoted by a white-out arrow, in accordance with which a part of air present in the transparent cylinder 27 is released through the air passage 26 as denoted by arrow ①.

Then, once an axial length L2 of the molten resin injected in the transparent cylinder 27, i.e. injection length L2 of the molten resin L2, has reached a value predetermined from among 50–90% of an effective axial length L1 of the transparent cylinder 27, the molten resin injection, denoted by the white-out arrow, is terminated as shown in FIG. 3B. Pictures of the injected molten resin flowing in the transparent cylinder 27 as shown in FIGS. 3A and 3B are taken by a high-speed camera 31, and visual display or reproduction (including slow-motion reproduction) are performed via a display device 32 having a picture recording function.

The following are reasons why the injection length L2 of the molten resin is selected from the range of 50–90% of the effective length L1, i.e. total volume or capacity, of the transparent cylinder 27 (L2=(50–90%). L1) in the present invention. Let it be assumed here that a maximum pressure resisting capability of the transparent cylinder 27 is 0.5 MPa and the air passage 26 is closed in an initial state.

Before initiation of the molten resin injection, an air pressure of 0.1 MPa exists in the test transparent cylinder 27. When the molten resin has been injected into, i.e. has occupied, half (50%) of the total capacity of the transparent cylinder 27, the injection increases the air pressure in the cylinder 27 up to 0.2 MPa, which is two times as high as the original pressure of 0.1 MPa, and the injected molten resin is also pressurized to 0.2 MPa due to pressure balance action in the cylinder 27; therefore, the transparent cylinder 27 will not burst under these conditions.

Further, when the molten resin has been injected into, i.e. has occupied, four fifths (80%) of the test transparent cylinder 27, the injection increases the air pressure in the cylinder 27 up to 0.5 MPa, which is five times as high as the original pressure of 0.1 MPa, and the injected molten resin is also pressurized to 0.5 MPa due to pressure balance in the cylinder 27; in this case, the transparent cylinder 27 reaches the upper limit of its pressure resisting capability.

If the air passage 26 is opened, the air pressure increase in the transparent cylinder 27 can be delayed because of a decrease in the volume of air in the transparent cylinder 27, so that the maximum injection amount, i.e. maximum occupancy of the molten resin in the transparent cylinder 27, can be raised from the above-mentioned 80% to 90%.

Also, since the resin-flow observing experiment proposed by the present invention is intended for observing a flow of the molten resin, the injection length L2 of the molten resin smaller than the value "0.5 L1" does not permit satisfactory observation. For the reasons stated above, the injection length L2 of the molten resin is selected from the range of 50–90% of the effective length L1 of the transparent cylinder 27. Namely, in the present invention, the molten resin injection is carried out until the injected molten resin occupies the predetermined percentage, in the range of 50–90%, of the total volume of the transparent cylinder 27. Stated differently, the molten resin injection is terminated when the injected molten resin has occupied the predetermined percentage of the total capacity of the transparent cylinder 27.

Figure 4:
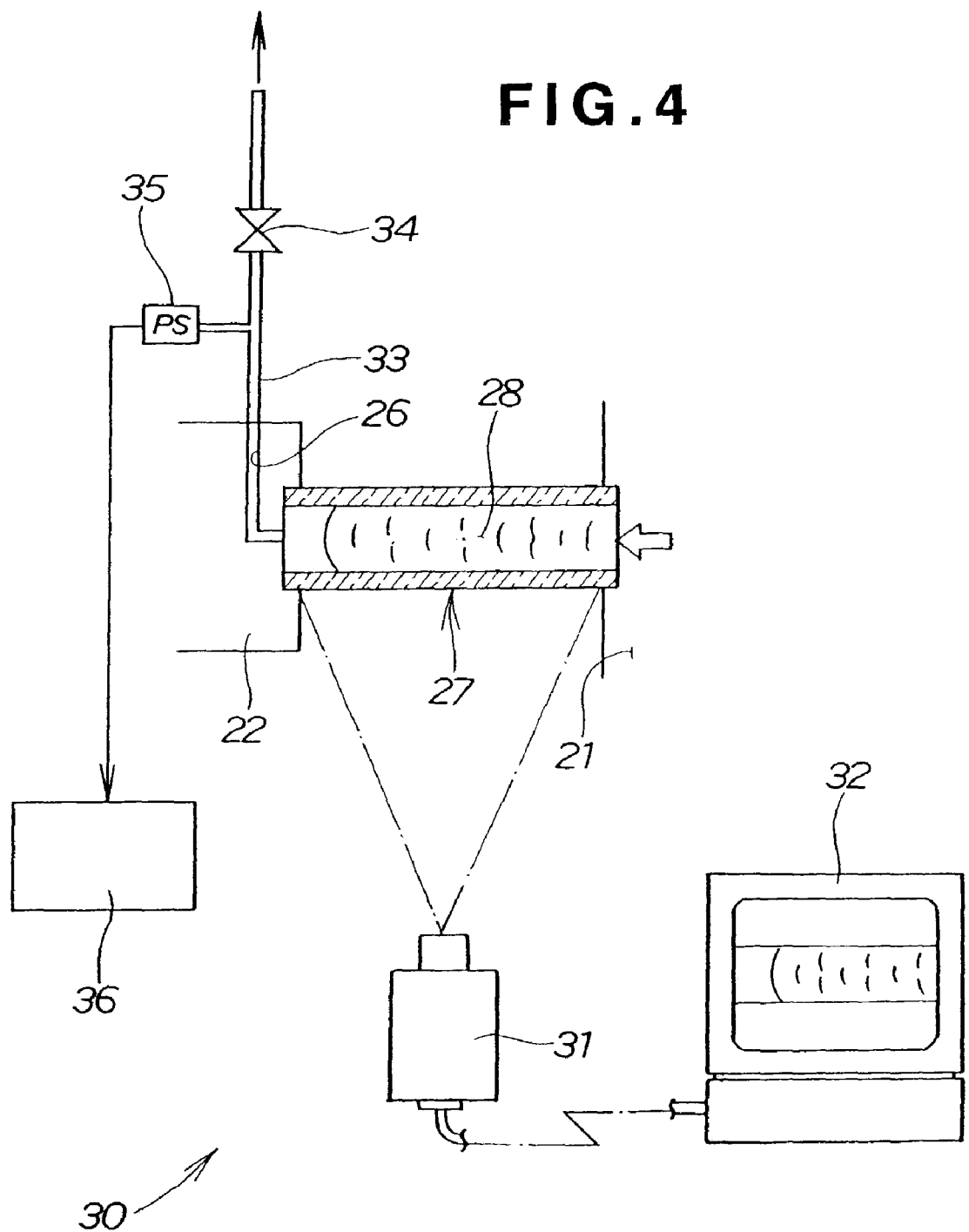
FIG. 4 is a diagram explanatory of the basic principles of a resin-flow observing apparatus of the present invention.
Figure 5:
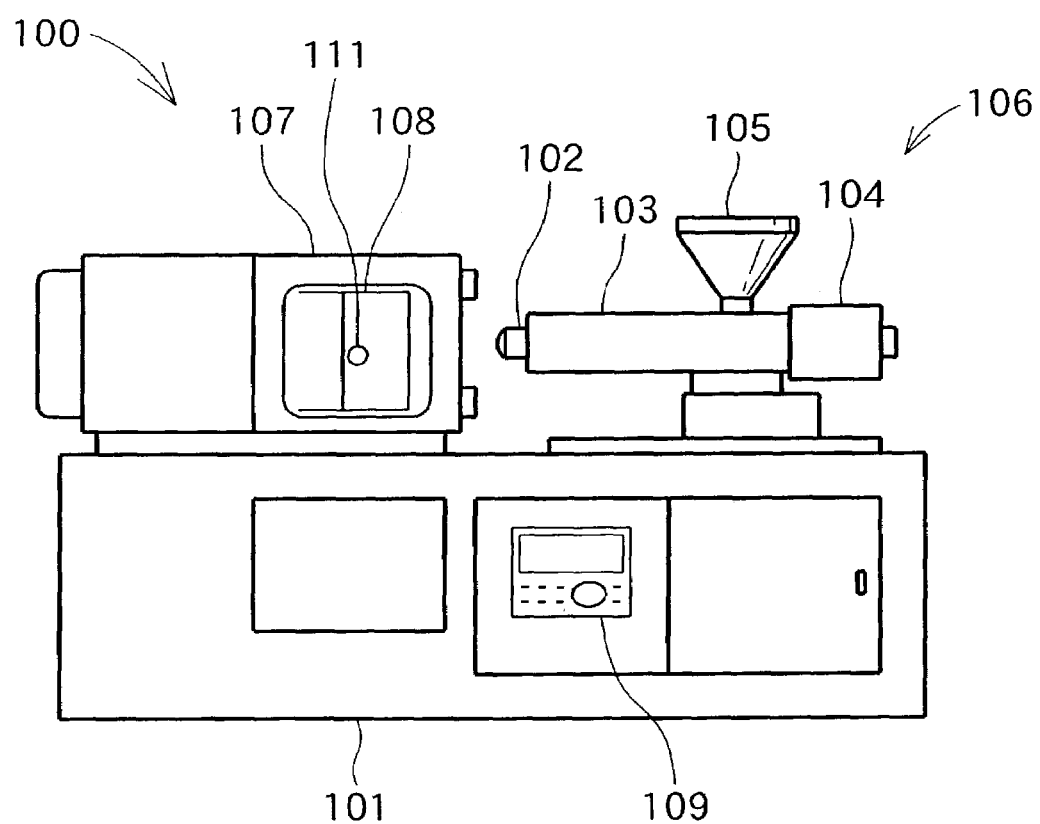
FIG. 5 is a front view of an injection molding apparatus provided with a convention resin-flow observing apparatus.

FIG. 4 is a diagram explanatory of the basic principles of the resin-flow observing apparatus of the present invention. Preferably, the resin-flow observing apparatus 30 includes the dummy fixed mold half 21, transparent cylinder 27, dummy movable mold half 22, air passage 26, pressure sensor 35, controller 36, high-speed camera 31, and display device 32. Exhaust pipe 33 is connected to one end of the air passage 26 and a flow-rate adjusting valve 34 is provided in the exhaust pipe 33, so that the flow rate of air to be leaked or released from the transparent cylinder 27 can be adjusted as necessary. In addition, the exhaust pipe 33 is provided with the pressure sensor 35 to measure a current inner pressure of the transparent cylinder 27. Information of the pressure measured by the pressure sensor 35 is supplied to the controller 36 (corresponding to the input/output device 109 in FIG. 5), so that the controller 36 controls the injection unit to terminate the molten resin injection in accordance with the supplied information. With such arrangements, the injection unit can be automatically deactivated to terminate the molten resin injection at appropriate timing, which can reduce loads on the human operator conducting the test.

As a modification of the present invention, the air passage 26 may be omitted; instead, there may be formed a slight gap between the dummy movable mold half 21 and the transparent cylinder 27. Further, ring-shaped packing members may be mounted at the opposite ends of the transparent cylinder 27 so that the transparent cylinder 27 is retained at the opposite ends between the dummy fixed mold half and the dummy movable mold half via the packing members.

In summary, according to the present invention, the molten resin injection into the transparent cylinder is terminated when the predetermined percentage, in the range of 50–90%, of the total volume or capacity of the transparent cylinder has been occupied with the molten resin, it is possible to prevent an undesired burst of the transparent cylinder, so that the resin-flow observing experiment can be conducted safely. Further, the resin-flow observing apparatus of the present invention can be constructed at extremely low cost because no modification or change has to be made to the existing mold, and it also provides a greatly-increased resin-flow observation range to thereby permit acquisition of data of better quality. As a result, the present invention achieves an increased resin-flow observation range at extremely low cost.

The present disclosure relates to the subject matter of Japanese Patent Application No. 2002-022455, filed Jan. 30, 2002, the disclosure of which is expressly incorporated herein by reference in its entirety.

What is claimed:

1. A method for observing a flow of resin in an injection molding apparatus, which comprises the steps of:

providing a transparent cylinder of glass or plastic material, the transparent cylinder being open at opposite ends thereof:

interposing the transparent cylinder in place of a mold between a fixed mold mount and a movable mold mount of a mold clamping unit of said injection molding apparatus;

causing an injection unit of said injection molding apparatus to inject molten resin into said transparent cylinder;

causing the injection unit to terminate injection of the molten resin when the injected molten resin has occupied a predetermined percentage of a total volume of said transparent cylinder; wherein the predetermined percentage is in a range of 50–90%; and during injection of the molten resin into the transparent cylinder, performing direct visual observation of a flow of the injected molten resin inside the transparent cylinder.

2. An apparatus for observing a flow of resin in an injection molding apparatus, which comprises:

a transparent cylinder interposed in place of a mold between a fixed mold mount and movable mold mount of a mold clamping unit of said injection molding apparatus, the transparent cylinder being open at opposite ends thereof and formed from glass or plastic material;

a controller for causing an injection unit of said injection molding apparatus to inject molten resin into said transparent cylinder and causing the injection unit to terminate injection of the molten resin when the injected molten resin has occupied a predetermined percentage of a total volume of said transparent cylinder; wherein the predetermined percentage is in a range of 50–90%; and means for performing direct visual observation of a flow of the injected molten resin inside the transparent cylinder while the molten resin is injected into the transparent cylinder.

3. The method as defined in claim 1, wherein said direct visual observation is carried out by taking an image of the injected molten resin through the transparent cylinder with a high-speed camera, and visually reproducing the image of the injected molten resin on a display device.

4. The apparatus as defined in claim 2, wherein said direct visual observation performing means comprises a high-speed camera that takes up an image of the injected molten resin through the transparent cylinder, and a display device that visually reproduces the image of the injected molten resin taken by the high-speed camera.

* * * * *